A. SWANSON.
VALVE ACTUATING DEVICE.
APPLICATION FILED SEPT. 30, 1921.
1,399,824.
Patented Dec. 13, 1921.
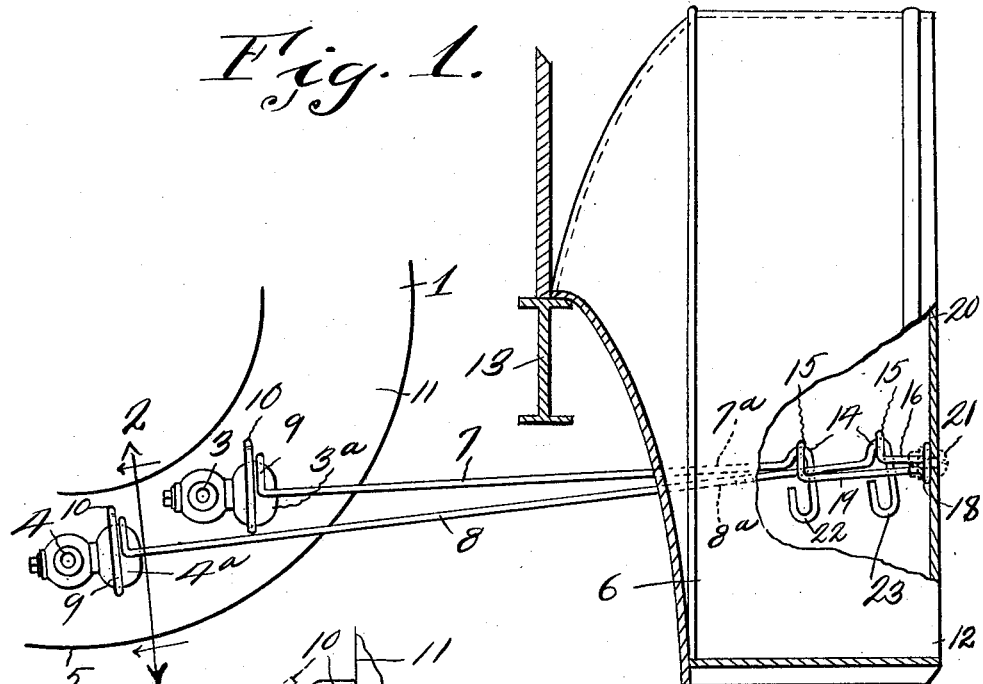
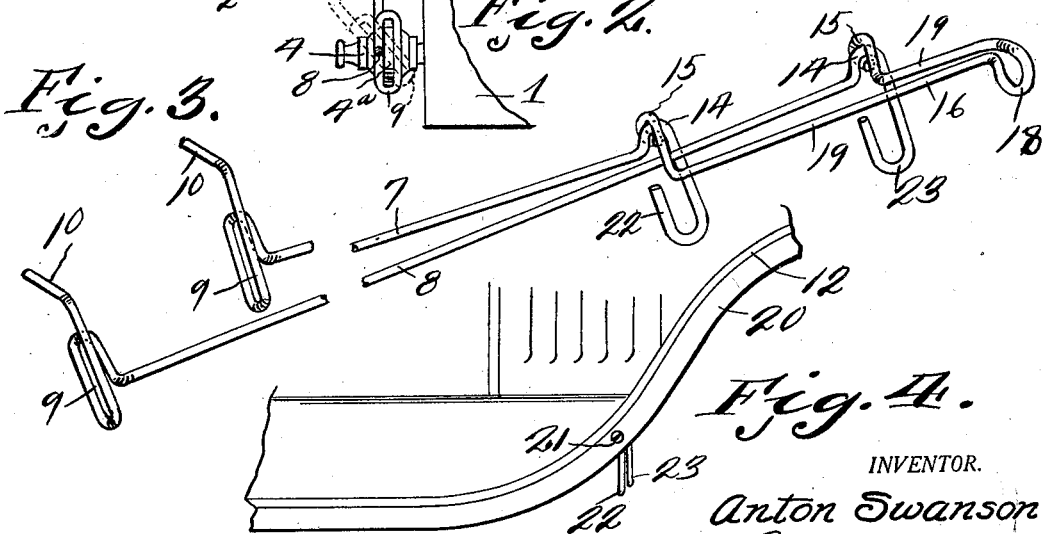
INVENTOR.
Anton Swanson
BY
George J. Ottsch
ATTORNEY.

UNITED STATES PATENT OFFICE.

ANTON SWANSON, OF SOUTH BEND, INDIANA, ASSIGNOR TO THE CAMPBELL WIRE SPECIALTY WORKS, OF SOUTH BEND, INDIANA, A CORPORATION OF INDIANA.

VALVE-ACTUATING DEVICE.

1,399,824.           Specification of Letters Patent.       Patented Dec. 13, 1921.

Application filed September 30, 1921. Serial No. 504,426.

*To all whom it may concern:*

Be it known that I, ANTON SWANSON, a citizen of the United States, residing at South Bend, in the county of St. Joseph and State of Indiana, have invented certain new and useful Improvements in Valve-Actuating Devices, of which the following is a specification.

The invention relates to valve actuating devices, and has for its object to provide a device of this character formed from wire and adapted to be attached to pet cocks carried by an engine casing of a motor driven vehicle, and so positioned that the pet cocks may be opened or closed from a position below the front fender of the vehicle. Also to so position the outer ends of the valve actuating members that said valves may be opened and closed without the operator having to kneel, or reach under the vehicle.

A further object is to provide, in combination with valves carried by an engine casing, outwardly extending operating rods formed from rod material, the outer ends of said rods terminating in loops, which loops are spaced apart and are received in eyes of a substantially horizontally disposed supporting member formed from a single piece of wire and attached to the skirt of the fender. Also to provide the looped members with downwardly extending U-shaped portions forming handle members adapted to be grasped by the operator for rotating the rods when opening or closing the valves.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a transverse vertical sectional view through a conventional form of automobile fender, frame and portion of the body, showing a portion of the engine casing having spaced pet cocks thereon, and the pet cock actuating device applied thereto.

Fig. 2 is a sectional view through one of the valve actuating rods taken on line 2—2 of Fig. 1.

Fig. 3 is a perspective view of the valve actuating device.

Fig. 4 is a side elevation of a portion of the fender, showing end views of the handle members carried by the actuating rods.

Referring to the drawings, the numeral 1 designates an engine casing, which engine casing is provided with pet cocks 3 and 4 adjacent its lower side 5, by means of which pet cocks an operator may ascertain the level of the lubricant within the casing, the proper level being a level between the pet cocks 3 and 4. When the operator desires to ascertain the level of the lubricant within the casing he opens the pet cocks 3 and 4 and if no lubricant flows from the pet cock 3 and lubricant does flow from the pet cock 4, he does know that the level of the lubricant is proper. It is the present practice for the operator to kneel or lean over adjacent the side of the automobile, reach under the fender 6 and grasp the thumb engaging members $3^a$ and $4^a$, and open the pet cocks. However, this soils the hands as considerable grease accumulates on the pet cocks and adjacent the same, which grease forms a collecting place for dust and dirt, consequently the operator gets his hands full or covered with grease. To obviate this difficulty valve actuating rods 7 and 8 are provided, the inner ends of which rods are provided with elongated loops 9 formed integral with the rods 7 and 8, and by bending the rods. Loops 9 are substantially right angularly disposed in relation to the rods 7 and 8, and have their ends terminating in arms 10 which extend in the direction of the surface 11 of the casing 1 and form means for limiting the inward movement of the rods, thereby insuring the proper closed positions of the finger engaging members $3^a$ and $4^a$, which finger engaging members are disposed in the loops 9. It will be seen that when the rods 7 and 8 are moved outwardly in their rotation, that the loops 9 in which the finger engaging members $3^a$ and $4^a$ are disposed, will cause said finger engaging members to be rotated to open position, when lubricant will be allowed to flow through either pet cock 3 or 4 if the lubricant is at the level with said pet cocks.

The outer ends $7^a$ and $8^a$ of the rods 7 and 8 are disposed beneath the front fender 12 of the automobile and outside of the side rails 13 of the vehicle frame, and terminate in upwardly extending offset loops 14 which are spaced from each other and extend through eyes 15 of a horizontally disposed supporting bracket 16. The bracket 16 is formed from a single piece of wire bent upon itself to form a bolt receiving loop 18 disposed at a right angle to the substantially parallel arms 19 of the supporting bracket and through which loop and the skirt 20 of the fender 12 a bolt 21 extends. Extending downwardly from the offset loops 14 are U-shaped members 22 and 23, which form handle members adapted to be grasped by the operator for rotating the operating rods 7 and 8 in the eyes 15 and opening the pet cocks 3 and 4 as desired. It will be seen that the rods 7 and 8 may be independently operated and that by forming the bracket 16 and the operating rods 7 and 8 from single pieces of wire or rod material, the device as a whole may be easily and quickly constructed, thereby reducing the cost of manufacture to a minimum and entirely eliminating machine work. It will also be seen that the device is simple in construction and the number of parts reduced to a minimum.

The invention having been set forth what is claimed as new and useful is:—

1. The combination with an engine casing having spaced pet cocks thereon and a fender having a downwardly extending skirt, of operating rods formed from rod material and attached to said pet cocks, loops formed on the ends of the rods for receiving the thumb engaging members of the pet cocks, the ends of said loops extending in the direction of the casing and forming means for engaging the casing and limiting the movement of the thumb engaging members in one direction, the outer ends of said rods being provided with handle members, and a bracket attached to the downwardly extending skirt and in which the operating rods have a bearing.

2. The combination with thumb engaging members of spaced pet cocks carried by an automobile engine casing and a fender, of operating rods for operating said pet cocks, said operating rods being formed from rod material, the ends of said rods being bent to form loops for the reception of the thumb engaging members, said loops terminating in lugs coöperating with the engine casing for limiting the movement of the thumb engaging members in one direction, the outer ends of said lugs being bent to form upwardly extending offset portions, a horizontally disposed bracket carried by the fender and formed from a single piece of rod material, said bracket being bent to form spaced eyes for the reception of the upwardly extending offset portions of the rods, said rods at points beyond the upwardly extending offset portion being provided with downwardly extending portions forming operating handles.

3. The combination with a thumb engaging member of a pet cock carried by an engine casing of an automobile and a fender, of an operating rod for said pet cock, said rod being bent on its inner end to form a loop at a right angle to the rod for the reception of a thumb engaging member, said rod beyond the loop terminating in a casing engaging arm, a bracket carried by the fender, said bracket being provided with an eye, the outer end of said rod terminating in a looped portion the upper end of which has a bearing in the eye of the bracket and the lower end of which forms a handle member.

In testimony whereof I affix my signature.

ANTON SWANSON.